United States Patent [19]
Corato

[11] Patent Number: 4,615,676
[45] Date of Patent: Oct. 7, 1986

[54] CALCINING METHOD AND ENCLOSURE STRUCTURE THEREFOR

[75] Inventor: Renzo Corato, Mestre-Venezia, Italy

[73] Assignees: Alusuisse Italia, S.p.A., Milan; Italimpianti Societá Italiana Impianti, p.A., Genoa; Sirma S.p.A., Malcontenta, all of Italy

[21] Appl. No.: 686,465

[22] Filed: Dec. 26, 1984

[30] Foreign Application Priority Data

Dec. 29, 1983 [IT] Italy ............................... 84151 A/83

[51] Int. Cl.$^4$ ........................... F27D 3/00; F27B 9/26; F27B 11/00
[52] U.S. Cl. ........................................ 432/9; 432/137; 432/206
[58] Field of Search ............... 432/137, 138, 192, 206, 432/9, 10

[56] References Cited

U.S. PATENT DOCUMENTS

| | | | |
|---|---|---|---|
| 4,050,880 | 9/1977 | Naito et al. | 432/192 |
| 4,131,417 | 12/1978 | Dwight | 432/192 |
| 4,147,506 | 4/1979 | Southern et al. | 432/206 |

FOREIGN PATENT DOCUMENTS

| | | | |
|---|---|---|---|
| 319481 | 3/1920 | Fed. Rep. of Germany | 432/137 |
| 2021742 | 12/1979 | United Kingdom | 432/137 |

*Primary Examiner*—John J. Camby
*Attorney, Agent, or Firm*—Guido Modiano; Albert Josif

[57] ABSTRACT

Method for calcining carbonaceous blocks into carbonaceous bodies, in which either a continuous or intermittent operation furnace is used. After placing carbonaceous blocks to be calcined onto the loading platform of a cart, a containment structure or enclosure structure is formed around the carbonaceous blocks including a barrier, which is held away from and is adapted to completely enclose the carbonaceous blocks, with the optional exception of barrier formed on the surface of the loading platform on which the carbonaceous blocks rest. The barrier being effective to prevent seepage of air or gases therethrough during calcination. The containment or enclosure structure for implementing the method comprises a conventional cart for continuous and intermittent operation furnaces overlaid by a stacked arrangement including two side-by-side walls of refractory material wherebetween a barrier of carbonaceous powder is interposed, and a cover, including two slabs also formed from refractory material and arranged in two layers wherebetween a further barrier of carbonaceous powder is provided. An additional barrier of carbonaceous powder may be optionally provided on the loading platform of the cart.

19 Claims, 4 Drawing Figures

CALCINING METHOD AND ENCLOSURE STRUCTURE THEREFOR

BACKGROUND OF THE INVENTION

This invention relates to a method of calcining carbonaceous blocks into carbonaceous bodies, in particular anodes, in either continuous or intermittent operation furnaces, and to a containment structure for implementing the method.

The carbonaceous blocks are generally produced by pressure molding or extruding into a desired shape a carbon-carrying material mixture, such as petroleum coke, anthracite, gas black graphite and the like, with a binder material such as tars and/or pitches. By calcining such blocks the binder is baked to achieve desired mechanical and electric characteristics in the calcined bodies obtained.

Known are methods of calcining anodes in continuous operation furnaces.

Attempts have been made, which provide for the carbonaceous bodies (anodes) to be covered with carbonaceous powder for protection against oxidation, packed in muffles, placed on a cart, and pushed into the furnace in accordance with a preset thermal schedule.

Normally the composition of the carbonaceous powder is similar to the above indicated composition of the carbonaceous blocks but without the binder material.

Such attempts, while affording the advantage of providing carbonaceous bodies in a continuous cycle, have some drawbacks which this invention is directed to obviate.

One of these drawbacks is a high fuel consumption, resulting from the need for heating, together with the carbonaceous bodies, also a large body of carbonaceous powder covering them.

Another drawback is the time required for the operation of covering the anode with carbonaceous powder at the beginning of each cycle, and for removing the carbonaceous powder at the end of each cycle.

A further drawback originates from that, during calcination, the anodes are distorted and cracked owing to their contacting, either directly or indirectly through the carbonaceous powder, the cart walls.

SUMMARY OF THE INVENTION

According to the invention, all these drawbacks are obviated by a method for calcining carbonaceous blocks into carbonaceous bodies, in particular anodes, in furnaces, comprising the steps of inserting at least one of said carbonaceous blocks into at least one enclosure structure having internal surface walls and at least one opening through which the carbonaceous blocks are inserted therein, arranging said blocks at a distance from at least a prevailing part of said internal surface of the walls of said enclosure structure, closing said opening of said enclosure structure, introducing said enclosure structure into the furnace, leaving within said furnace said enclosure structure with the blocks to be calcined therein for a time period and temperature required for the calcination of said blocks into carbonaceous bodies, extracting said enclosure structure from said furnace, opening said enclosure structure at at least one zone thereof and extracting the calcined carbonaceous bodies from said enclosure.

In order to provide full insulation of the carbonaceous bodies to be calcined, prior to placing them onto a loading platform, which may be considered as a component part of the enclosure structure, a barrier or protective layer against air seepage may be spread over it, the peripheral edges of the barrier being adapted to communicate in abutment relationship with the internal surfaces of the sides of enclosure walls or stack of the containment structure or enclosure structure at the bottom thereof.

Advantageously the barrier may be formed as a layer of carbonaceous powder intervening between two containment layers of a refractory material.

While the carbonaceous powder with the above indicated composition, which normally is readily available on the site, has shown excellent results, powders or granular materials having another composition may be used, provided that during calcination a good impermeability against gas passage therethrough is obtained.

To implement this method the invention provides an enclosure or containment structure, characterized in that it includes side walls and a removable cover, forming jointly a protective barrier for the carbonaceous bodies to be calcined placed on the loading platform which is part of said structure.

Preferably, both the side walls and cover of the structure may be formed as two layers of refractory material between which the carbonaceous powder is interposed.

In order to provide for more complete insulation of the carbonaceous blocks against any air or gas seepage, each containment structure may be associated at the bottom with a layer of refractory material and with an overlying layer of carbonaceous powder, whereon the carbonaceous blocks to be calcined are placed.

BRIEF DESCRIPTION OF THE DRAWINGS

This invention is further explained hereinbelow with reference to a preferred embodiment and some modifications thereof, given by way of example and not of limitation, with reference to the accompanying drawings, where.

DESCRIPTION OF THE PREFERRED EMBODIMENTS

Figure 1:
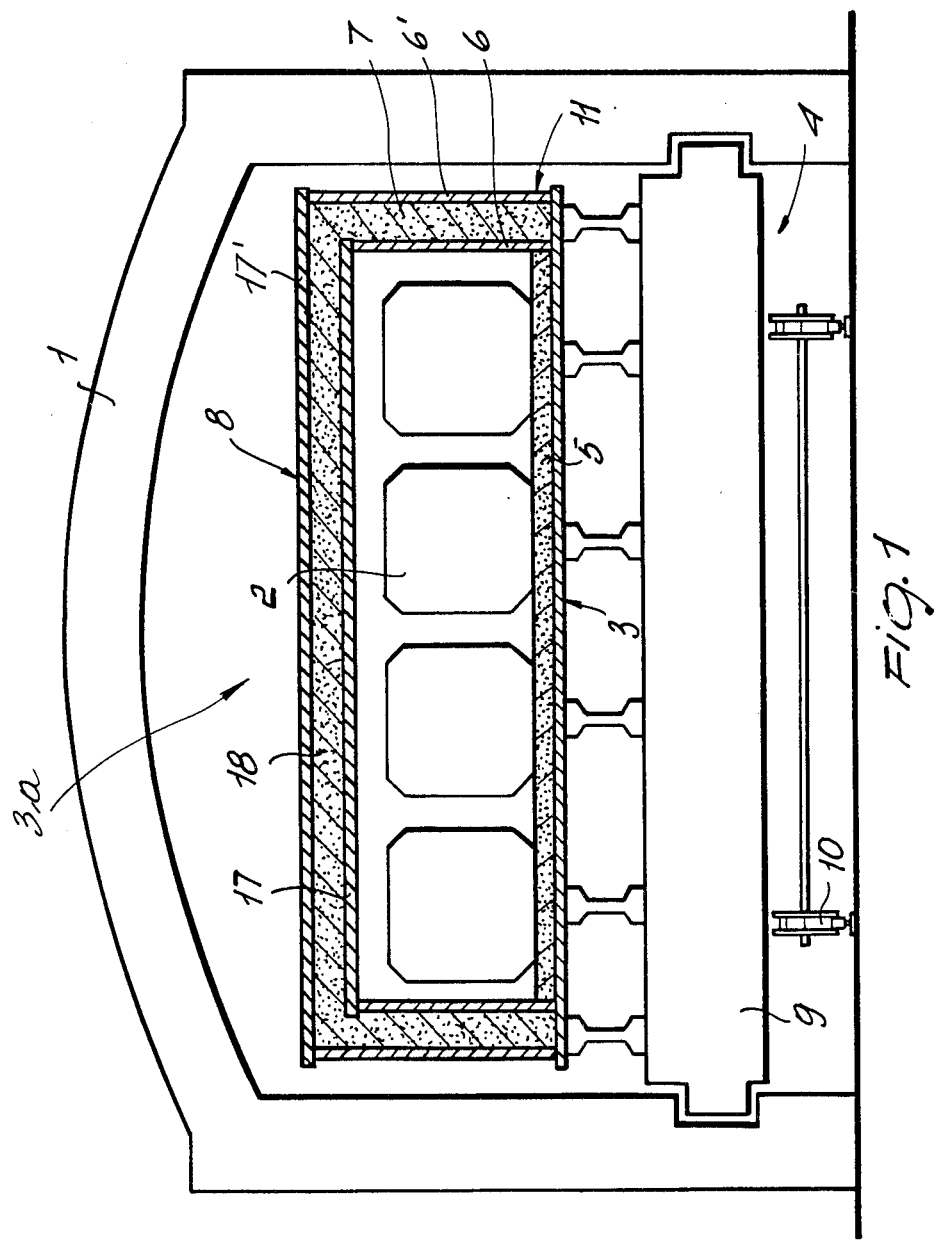
FIG. 1 is a partly sectional front view of an enclosure or containment structure for calcining, according to the invention, carbonaceous blocks in a furnace.
Figure 2:
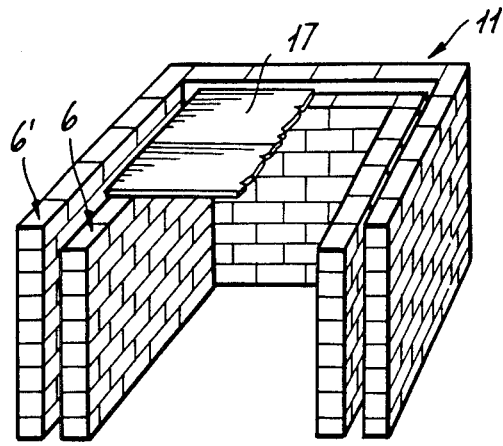
FIG. 2 is a fragmentary schematic perspective view of a different stack of structural elements for providing the structure of FIG. 1.
Figure 3:
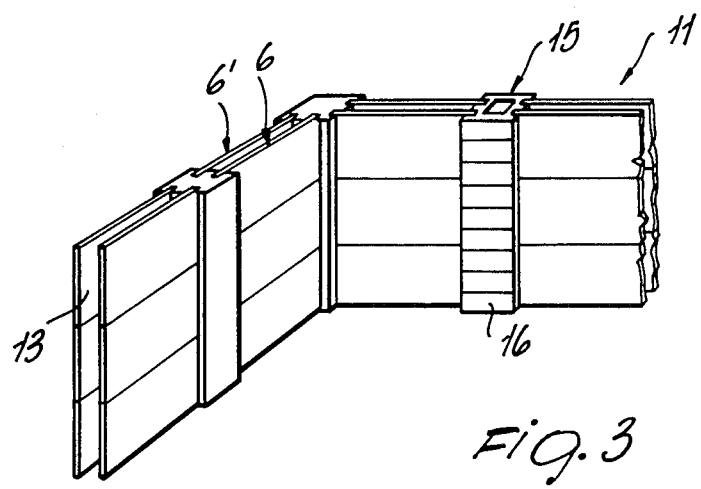
FIG. 3 is a fragmentary schematic perspective view of another stack of elements for constructing the structure of FIG. 1.
Figure 4:
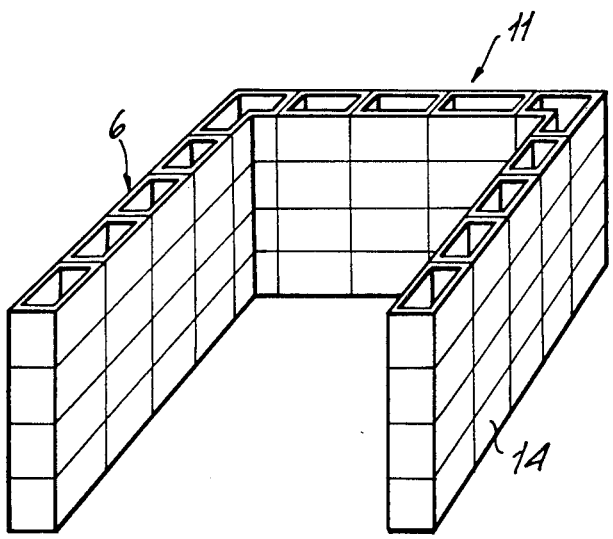
FIG. 4 is a fragmentary schematic perspective view of a further different stack of elements for the structure of FIG. 1.

As may be seen in the figures the method of this invention provides for the calcination of the carbonaceous blocks into calcined bodies to be carried out in a continuous furnace comprising, in this instance, a cart furnace 1, into which the anodes 2 to be calcined are placed, preferably in a single layer, but in some cases even in plural layers. More particularly, on the loading platform 3 of each cart 4 there is spread a layer of carbonaceous powder forming a barrier 5 whereon the anodes or carbonaceous blocks 2 to be calcined are placed, the enclosure or containment structure 3a is defined laterally by enclosure walls 11 including walls 6,6' of refractory material, wherebetween a barrier 7, is interposed, effective to prevent seepage of air or gases toward the anodes 2, said barrier 7 being preferably formed from carbonaceous powder. Similar front and rear walls of which only the rear walls are visible in FIGS. 2, 3, 4 are also formed.

After the enclosure walls have been formed, a cover 8 is placed onto the upper edges of said walls 6,6', above the anodes 2 to be calcined, the cover 8 being previously formed in a similar manner to said side barriers, including slabs 17,17' of refractory material, wherebetween an interstitial layer 18, preferably formed from carbonaceous powder is adapted to prevent seepage of air or gases towards the anodes 2, the assembly is then ready for delivery to the furnace 1, wherein calcination of the anodes takes place out of contact with air or gases surrounding the assembly.

The temperature and duration of the calcination is regulated according to the requirements. At the end of the calcination stage, the enclosure structure is extracted, the cover 8 removed and the calcined bodies 2 picked up. The empty enclosure structure is then returned towards the entrance of the furnace, preferably from the outside and is ready for use with an other batch of blocks to be calcined.

In essence, with the method of this invention, one can use for calcining the anodes 2 a continuous operation furnace, in this instance a cart furnace, with all the advantages that this type of furnace brings about from the standpoint of productivity.

In particular the cart furnace ensures continuity of the baking cycle, requires less maintenance, ensures increased productivity, and affords the faculty of applying a series of control and drive apparata which automate the processing cycle.

Furthermore, the baking method according to the invention requires, for a given number of anodes being processed, less carbonaceous powder than the quantity required by prior methods. Most of the carbonaceous powder, inter alia, and precisely that utilized in the barrier walls 7 and possibly that spread over the surface of the loading platform 3 forming the barrier 5, should not be removed and re-loaded at each calcining cycle.

The invention also provides a containment or enclosure structure which allows implementation of the method.

Said containment or enclosure structure 3a comprises a cart which, as most of the casts used in this furnace type, includes a base frame structure 9 equipped with wheels 10 for movement into the furnace 1 and carrying a "sole" which forms the loading platform 3, and an enclosure wall or stack 11 of structural elements, that is a lateral enclosure structure for the product placed on the loading platform 3. However, owing to the very need for forming over the stack 11 a layer of carbonaceous powder, this stack is formed with two side-by-side walls 6,6' of refractory material, wherebetween a space is left, wherein the carbonaceous powder 7 is placed.

These side walls 6,6' may each comprise a series of refractory bricks 12 (see FIG. 2) or series of refractory slabs 13 (see FIG. 3), or may alternatively comprise a single series of hollow refractory bricks 14 (see FIG. 4), into the interiors whereof the carbonaceous powder is introduced. Where refractory material slabs 13 are used, it becomes possible to adopt a modular structure comprising grooved uprights 15, formed from refractory material, between which the refractory material slabs 13 facing one another are placed to confine the space whereinto the carbonaceous powder 7 is introduced.

The uprights 15 may have a monolithic structure or be formed by overlaid elements 16, preferably hollow ones, inside which more carbonaceous powder may be introduced.

It is also possible to use sandwich panels in the construction of the stack, i.e. panels composed by pairing together two refractory material slabs with an intervening layer of carbonaceous powder.

The stack or enclosure wall, regardless of how it has been formed, is completed by the application of a removable cover 8, which preferably comprises one or more slabs 17,17' of refractory material (see FIG. 2) resting on the side walls 6,6' or resting on the anodes 2 to be baked, or resting on tubular uprights provided vertically inside the stack and not shown in the drawings. According to one embodiment, first a lower slab 17 is placed on the top edges of the inner side walls and inner front and rear walls. Over the slab 17 thus arranged, a layer of carbonaceous powder is then spread, forming a barrier 18 upon which an upper slab 17' is put to rest on the top edges of the outer side walls and outer front and rear walls, which completes insulation of the anodes 2 to be calcined from the outside.

Normally the horizontal slabs 17,17' are simply resting on the top edges of the side walls 6,6' so that, at the end of calcination the cover may be easily removed. However, engagement formation, not shown, may be provided on the engagement surfaces of the contacting portions for removable mutual engagement. The carbonaceous powder introduced in the interspaces of the wall structure of refractory material provides the required impermeability against gas passage, owing also to the action of the calcination temperature on the powder structure.

This invention has been described and illustrated with reference to a preferred embodiment and some modifications thereof, but it will be understood that more modifications may be made thereto without departing from the protection scope of this patent of industrial invention.

I claim:

1. A method for calcining carbonaceous blocks into carbonaceous bodies, in particular anodes, in furnaces, and with the use of at least one reusable enclosure structure arranged on bottom defining means and having side walls on said bottom defining means and a cover arranged on said side walls to enclose therewith an openable closed space, at least said side walls and said cover incorporating all over the extension thereof a protective layer for the carbonaceous blocks, at least one amongst said side walls and said cover being removably mounted to form said enclosure structure, the method comprising the steps of arranging at least one of said reusable enclosure structures at the outside of said furnace, placing at least one of said blocks into said space of said enclosure structure and at a distance from at least a prevailing part of said side walls thereof to leave a free space between said blocks and said side walls, introducing said enclosure structure into the furnace, leaving within said furnace said enclosure structure with said blocks in position within said space for a time period and temperature required for the calcination of said blocks into carbonaceous bodies, extracting said enclosure structure from said furnace, extracting the calcined carbonaceous bodies from said enclosure structure and reusing said enclosure structure for a subsequent calcination cycle.

2. A method according to claim 1, which is carried out in a continuous operation furnace.

3. A method according to claim 1, which is carried out in an intermittent operation furnace.

4. A method according to claim 1, which comprises providing a cart adapted to be shifted into said furnace said cart having a resting surface and arranging said enclosure structure and said carbonaceous blocks on said resting surface, said resting surface constituting said bottom defining means.

5. A method for calcining carbonaceous blocks into carbonaceous bodies according to claim 1, comprising providing said protective layer in the form of a substantially impermeable barrier thereby preventing passage of gases through said enclosure structure.

6. A method according to claim 5, which comprises providing on said resting surface all over its extension delimited within the side walls of said enclosure structure said protective layer.

7. A method according to claim 1 which comprises providing said enclosure structure of refractory material and said protective layer of powder material.

8. A method according to claim 7, which comprises providing said powder material in the form of a carbonaceous powder.

9. A method according to claim 1, which comprises providing said enclosure structure at least in part with double walled portions of refractory material forming an interspace therebetween and providing within said interspace said protective layer.

10. A method according to claim 1, which comprises providing said enclosure structure of hollow refractory superposed elements and inserting said protective layer into the hollow spaces of said hollow elements to form a substantially gas impermeable barrier.

11. A reusable enclosure structure supported on a resting surface and for containing therein carbonaceous blocks placed on said resting surface during calcining thereof within continuous or intermittent operation furnaces, the structure comprising side walls arranged at a distance from said carbonaceous blocks to define a closed periphery of the enclosure and a cover mounted thereon, at leat one among said side walls and said cover being removably mounted to allow for opening said structure and the insertion of the carbonaceous blocks into the enclosure structure, and further comprising a protective layer incorporated within said side walls and said cover, said protective layer forming a gas barrier within the enclosure structure.

12. A structure according to claim 11 wherein said protective layer comprises a carbonaceous powder acting as gas barrier.

13. A structure according to claim 12, wherein said side walls and cover comprise two refractory material layers between which the carbonaceous powder is interposed.

14. A structure according to claim 12, wherein said side walls comprise a single series of hollow refractory bricks inside which the carbonaceous powder is interposed.

15. A structure according to claim 13, wherein each of said two layers of refractory material comprise slabs inserted in grooved uprights also formed from refractory material.

16. A structure according to claim 15, wherein said grooved uprights have a monolythic shape.

17. A structure according to claim 15, wherein said grooved uprights comprise hollow superimposed elements, into the interiors whereof carbonaceous powder is interposed.

18. A containment unit for containing therein carbonaceous blocks to be calcined into carbonaceous bodies within continuous or intermittent operation surfaces, the unit comprising a movable loading platform defining a resting surface, at least one carbonaceous block placed on said resting surface, a reusable enclosure structure supported on said resting surface and enclosing said at least one block, the structure comprising side walls arranged at a distance from said carbonaceous block to define a closed periphery of the enclosure and a cover mounted thereon, at least one among said side walls and said cover being removably mounted to allow for opening said structure and for the insertion of the carbonaceous blocks into the enclosure structure, and further comprising a carbonaceous powder protective layer incorporated within said side walls and said cover, said protective layer forming a gas barrier for the inside of said enclosure structure.

19. A containment unit according to claim 18, wherein said resting surface comprises said carbonaceous powder protective layer spread thereon and wherein said at least one carbonaceous block is placed on said carbnonaceous powder protective layer.

* * * * *